W. F. BALES.
RESILIENT TIRE.
APPLICATION FILED JUNE 26, 1919.
1,358,671.
Patented Nov. 9, 1920.
2 SHEETS—SHEET 1.
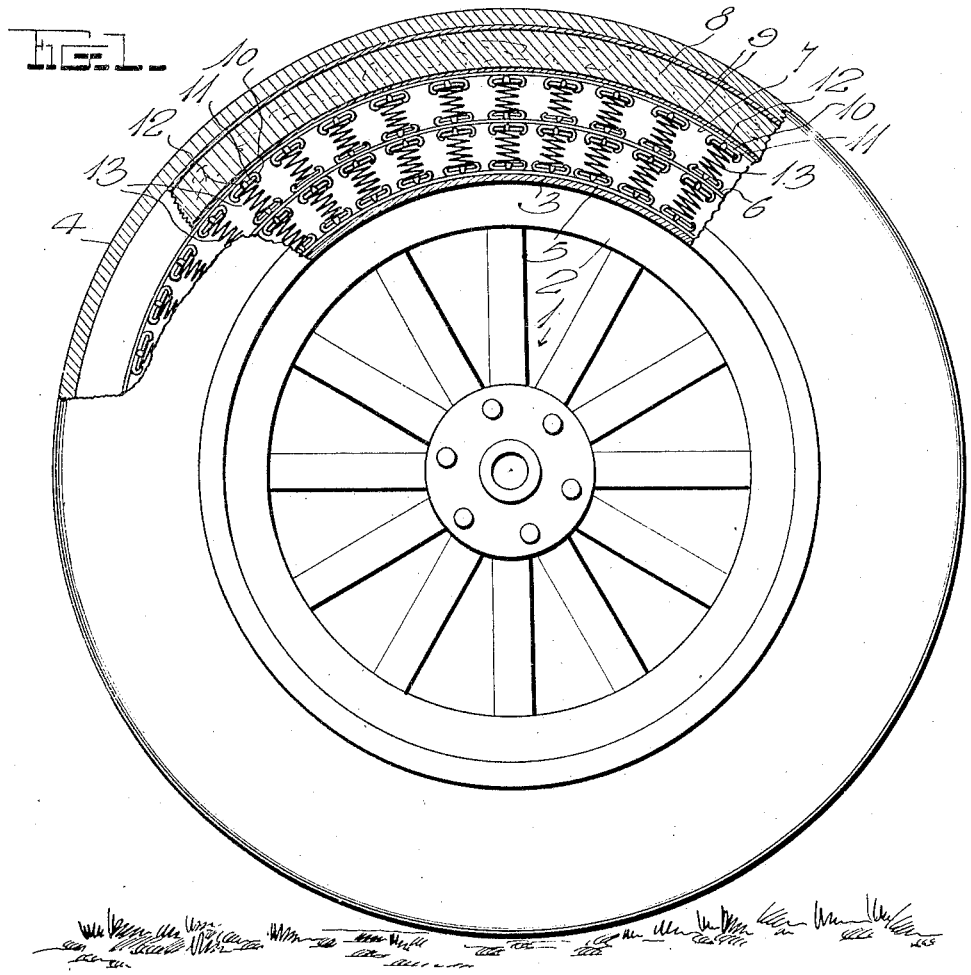
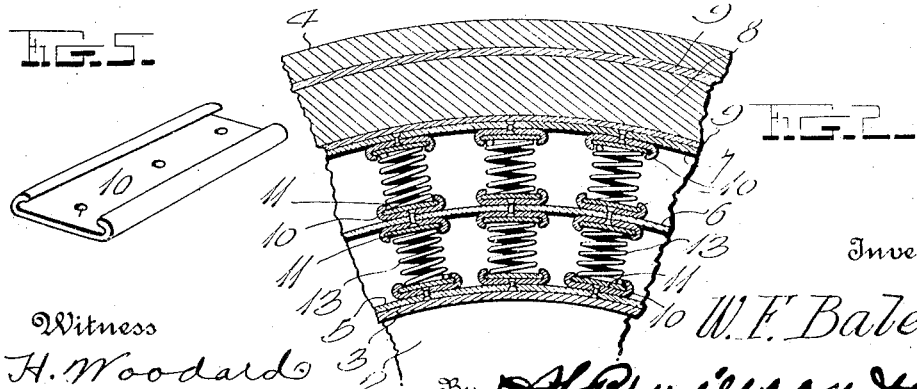
Witness
H. Woodard
Inventor
W. F. Bales
By H. B. Wilson & Co
Attorneys

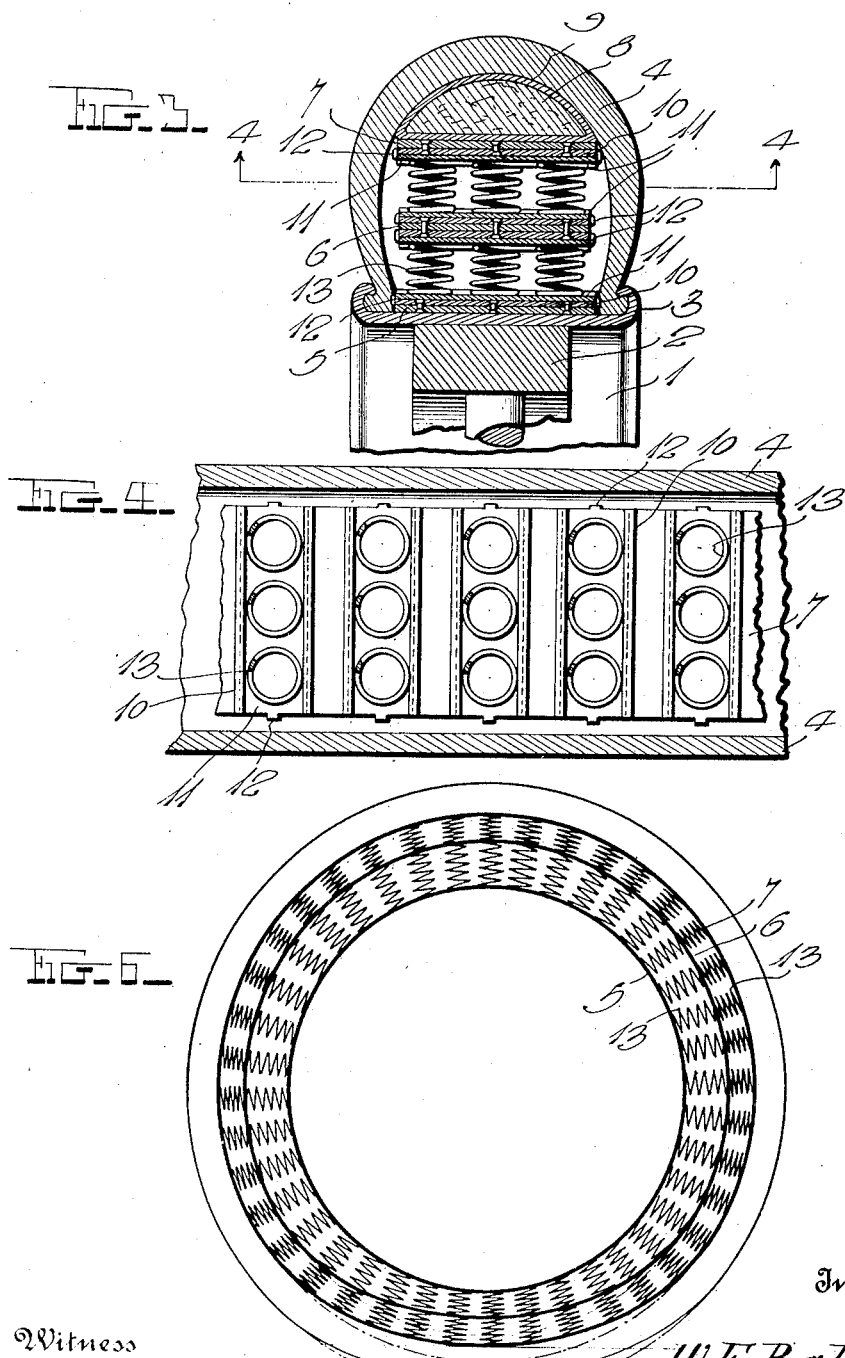

UNITED STATES PATENT OFFICE.

WILBUR F. BALES, OF SLATER, MISSOURI.

RESILIENT TIRE.

1,358,671.  Specification of Letters Patent.  Patented Nov. 9, 1920.

Application filed June 26, 1919. Serial No. 306,878.

*To all whom it may concern:*

Be it known that I, WILBUR F. BALES, a citizen of the United States, residing at Slater, in the county of Saline and State of Missouri, have invented certain new and useful Improvements in Resilient Tires; and I do declare the following to be a full, clear, and exact description of the invention, such as will enable others skilled in the art to which it appertains to make and use the same.

This invention relates to certain new and useful improvements in resilient tires for vehicles.

The primary object of the invention is to provide a tire which will have all of the resiliency that an ordinary pneumatic tire has, and yet is so constructed that it cannot be deflated by puncture.

Another object of the invention is to provide a resilient tire in which the resilient members are arranged in sets or units so that they can easily be removed or assembled should repairing become necessary.

A further object of the invention is to generally improve upon devices of this class by the provision of a comparatively simple, strong, durable and inexpensive construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate like parts throughout the several views;

Figure 1 is a side elevation, partly in section, of a wheel having a tire constructed in accordence with this invention.

Fig. 2 is a longitudinal sectional view of a portion of the tire.

Fig. 3 is a transverse sectional view of the same.

Fig. 4 is a section taken on the line 4—4 of Fig. 3.

Fig. 5 is a perspective view of one of the channeled plates which form part of the means for anchoring the resilient members, and Fig. 6 is a diagrammatic view of the tire illustrating the operation of the resilient parts as the same is traveling over the ground.

Referring more particularly to the drawings, the numeral 1 designates a vehicle wheel which has a felly 2 carrying a rim 3 which in turn carries an outer tire casing 4. Disposed around the rim 3 and bearing against it is a stiff metal band 5, and arranged concentrically with respect to this is a resilient metal band 6 and a flexible band of thick belting material 7, said bands being spaced equal distances apart, the band 5 being an inner band, the band 6 an intermediate band, and the band 7 an outer band. Attached to the outer side of the outer band 7 is a cushion comprising a rubber body portion 8 and a cloth covering 9. The outer side of the cushion is rounded so as to conform to the shape of the inner side of the tire casing 4 against which it bears.

Riveted or otherwise secured to the adjacent sides of the bands 5, 6 and 7 are plates 10, the latter extending transversely of the bands and having their edges curved upwardly and inwardly to form suitable channels or grooves. These channels or grooves are adapted to slidably receive plates 11 having tongues 12 at their ends which are bent around the ends of the plates 10 to lock these parts in place. Brazed or otherwise anchored at their ends to the plates 11 are coil spring 13. Three of these coil springs are shown between each pair of plates 11 and these form a unit of resilient members.

When the tire is assembled as just described and placed upon a vehicle wheel, as the wheel revolves, the portion of the tire touching the ground will be flattened, the springs adjacent this portion being compressed. At the same time the intermediate band 6 will be slightly elongated in a horizontal direction and this will cause the remaining springs in the tire to come into play thus greatly adding to the resiliency of the same.

From the foregoing description, taken in connection with the accompanying drawings, the construction, use and operation of the invention will be readily understood. It will be seen that the objects of the invention have been effectively carried out as the tire is of simple construction and it can be easily taken apart and assembled in case repairing is necessary.

Various changes in form, proportion and in the minor details of construction may be resorted to without departing from the spirit of the invention, and I do not wish to be limited to the exact construction herein shown and described.

I claim:

A filler to be inserted between a rim and an outer tire casing comprising an inner band adapted to fit upon the rim, an intermediate band, an outer band, a plurality of sets of plates arranged on the adjacent sides of said bands and extending transversely of the same, means for securing said plates to said bands, said plates having their transversely extending edges bent inwardly upon themselves to provide transversely extending channels, flat plates slidably disposed in said channels, and coil springs having their ends anchored to said flat plates which are disposed in opposing channels.

In testimony whereof I have hereunto set my hand.

WILBUR F. BALES.